United States Patent [19]

Colonias et al.

[11] Patent Number: 5,109,646

[45] Date of Patent: May 5, 1992

[54] BEARING CONNECTION

[75] Inventors: Karen W. Colonias, Lafayette; Michael W. Bugbee, Hayward, both of Calif.

[73] Assignee: Simpson Strong-Tie Company, Inc., San Leandro, Calif.

[21] Appl. No.: 699,671

[22] Filed: May 14, 1991

[51] Int. Cl.⁵ .......................... E04B 7/04; E04B 1/38
[52] U.S. Cl. .................................. 52/712; 52/665; 403/232.1; 403/384; 403/402; 403/406.1; 248/300
[58] Field of Search .................................. 52/712-715, 52/90, 92, 639, 663; 248/300; 403/230, 231, 232.1, 384, 389, 217, 219, 402, 188, 406.1

[56] References Cited

U.S. PATENT DOCUMENTS

| 1,036,439 | 8/1912 | Brown | 403/406.1 |
| 1,652,612 | 12/1927 | Daniels | 403/406.1 |
| 1,657,243 | 1/1928 | Daniels | 248/300 |
| 2,321,221 | 6/1943 | Linehan | 403/230 |
| 2,372,768 | 4/1945 | Davison | 521/639 |
| 2,413,362 | 12/1946 | Maxwell et al. | 403/219 |
| 2,477,163 | 7/1949 | Barnett | 403/188 |
| 2,988,854 | 6/1961 | McKinley | 403/406.1 |
| 3,854,268 | 12/1974 | Gutner | 403/231 |
| 4,410,294 | 10/1983 | Gilb et al. | 403/232.1 |
| 4,932,173 | 6/1990 | Commins | 52/92 |
| 5,004,369 | 4/1992 | Young | 403/402 |

OTHER PUBLICATIONS

Teco Framing Anchors, p. 4, copyright 1972.
Cleveland Steel Specialty Co. copy of Scissor Truss Connector brochure, 1985.

Primary Examiner—James L. Ridgill, Jr.
Attorney, Agent, or Firm—James R. Cypher

[57] ABSTRACT

A bearing connection in a building structure for distributing downward gravity bearing loads through fasteners driven through sheet metal connectors and into a load carrying wood structural member such as a floor joist, a roof rafter or a wood truss member, through a pair of sheet metal connectors and into a wood plate member via fasteners driven through the connectors and into the plate member. Seismic, hurricane or other upward forces are also resisted by the same connectors and fasteners. Relative movement between the load carrying structural member and the plate member is also resisted in a generally horizontal direction transverse as well as parallel to the plate member.

7 Claims, 6 Drawing Sheets

BEARING CONNECTION

BACKGROUND

A common problem with engineered wood structural components such as trusses is that they are unable to carry loads which exceed the compression limitations of the wood bearing surfaces. Specifically, a truss or plate member fabricated from softer species of lumber such as spruce-pin-fir is subject to failure due to crushing when the compression load is perpendicular to the wood grain. Heretofore, the solution to the design limitation of the bearing surface was to add an additional ply to the truss which gave the needed bearing area, but this solution is expensive and adds unnecessary weight to the structure. Another solution was to encapsulate the end of the truss in the heavy metal U-member and to place a heavy metal plate or U-member on the wood plate beneath the metal encapsulated truss end. This solution is also expensive, adds unnecessary weight to the structure and there are no side benefits from such a "T" connection as will be discussed below with the present invention.

Attempts to decrease the cost of the heavy metal bearing plates using specially designed sheet metal connectors have been unsuccessful. Those prior art sheet metal connectors that did not channel the load away from the contact area of the end of the truss were simply of little use. Those sheet metal connectors that attempted to spread the load failed due to buckling of the thin metal. The use of "off the shelf" connectors have also failed due to the concentration of nails directly under the bearing area; resulting in splitting of the plate member.

SUMMARY OF THE DISCLOSURE

This application teaches a one piece sheet metal connector which provides an enhanced bearing capacity for trusses and rafters which rest on top plates and in addition provides increases resistance to uplift loads. A portion of the load on the truss is transferred through connecting nails in the truss, through the metal connector and through connecting nail in the side of the plate members.

An object of the present invention is to provide a connector which may be used with either single or double thickness rafters or trusses without modification.

Another object is provide a connector which may be mounted on both sides of a rafter or truss.

A further object is to provide a connector which restrains movement of the truss relative to the plate in both directions longitudinally of the truss, and both directions transversely of the truss.

Still another object is to provide a connector which may be connected to both plates of a double plate structure thereby providing greater resistance to uplift forces exerted on the rafter or truss.

Another object is to provide a connector which may be easily field bent to avoid interference with walls pre-sheathed with plywood, gypsum board or other sheathing.

Still another object is to provide a connector which will not result in splitting of the wood plate member.

DESCRIPTION OF THE PREFERRED EMBODIMENTS

The present invention is a bearing connection 1 in a building structure including a load carrying wood structural member 2 having first and second opposed sides 3 and 4 and a lower edge 5, and a generally horizontally disposed wood plate member 6 having first and second sides 7 and 8 and mounted below the load carrying wood structural member 2 and having an upper surface 9 for supporting a portion of the lower edge 5 of the load carrying wood structural member 2; the improvement comprising: a first single piece sheet metal connector 10 including a generally upright member 11 having a pair of side edges 12 and 13 and a face 14, disposed in juxtaposition with the first side 3 of the load carrying wood structural member 2, first and second leg members 15 and 16 respectively and integrally connected to the side edges 12 and 13 of the generally upright member 11 and extending angularly therefrom a selected distance wherein a lower portion 27 of the first leg member 15 registers with the first side 7 of the wood plate member 6 and a lower portion 28 of the second leg member 16 registers with the second side 8 of the wood plate member 6, and stiffening means 17 formed in upper portions 39 and 40 of each of the first and second leg members 15 and 16 for increasing the column strength of the first and second leg members 15 and 16; a second single piece sheet metal connector 18 including: a generally upright member 19 having a pair of side edges 20 and 21 and a face 22, disposed in juxtaposition with the second side 4 of the load carrying wood structural member 2, first and second leg members 23 and 24 respectively and integrally connected to the side edges 20 and 21 of the generally upright member and extending angularly therefrom a selected distance wherein a lower portion 25 of the first leg member 23 registers with the second side 8 of the wood plate member 6 and a lower portion 26 of the second leg member 24 registers with the first side of the wood plate member, and stiffening means 29 formed in an upper portions 41 and 42 of each of the first and second leg members 23 and 24 for increasing the column strength of the first and second leg members 23 and 24; a first of fasteners 32 inserted through the face 14 of the generally upright member 11 of the first single piece sheet metal connector 10 in a generally horizontal orientation into the load carrying wood structural member 2; a second plurality of fasteners 33 inserted through the face 22 of the generally upright member 19 of the second single piece sheet metal connector 18 in a generally horizontal orientation into the load carrying wood structural member 2; a third plurality of fasteners 34 inserted through the lower portion 27 of the first leg member 15 of the first single piece sheet metal connector 10 and the first side 7 of the wood plate member 6 and into the wood plate member 6 in a generally horizontal orientation; a fourth plurality of fasteners 35 inserted through the lower portion 28 of the second leg member 16 of the first single piece sheet metal connector 10 and the second side 8 of the wood plate member 6 and into the wood plate member 6 in a generally horizontal orientation; a fifth plurality of fasteners 36 inserted through the lower portion 25 of the first leg member 23 of the second single piece sheet metal connector 18 and the second side 8 of the wood plate member 6 and into the wood plate member 6 in a generally horizontal orientation; and a sixth plurality of fasteners 37 inserted through the lower portion 26 of the second leg member 24 of the second single piece sheet metal connector 18 and the first side 7 of the wood plate member 6 and into the wood plate member 6 in a generally horizontal orientation.

In the bearing connection of the present invention, preferably the stiffening means 17 and 29 formed in each of the leg members 15, 16, 23, and 24 consists of an embossment.

Specifically, in the bearing connection of the present invention, the stiffening means 17 and 29 formed in each of the leg members 15, 16, 23, and 24 consists of triangular embossments 44, 45, 46, and 47. p Applicants found that the bearing capacity of the connection was significantly increased by simply adding seat members 56 and 57 integrally connected to the bottom edges 54 and 55 and protruding outwardly from the upright members 11 and 19 at a right angle and resting on the upper surface 9 of the wood plate member 6.

In many buildings, the bearing connection as described above will be constructed with the generally horizontally disposed wood plate member 6 consisting of upper and lower wood plate members 59 and 60 laid one on top of the other.

Figures 7, 8:
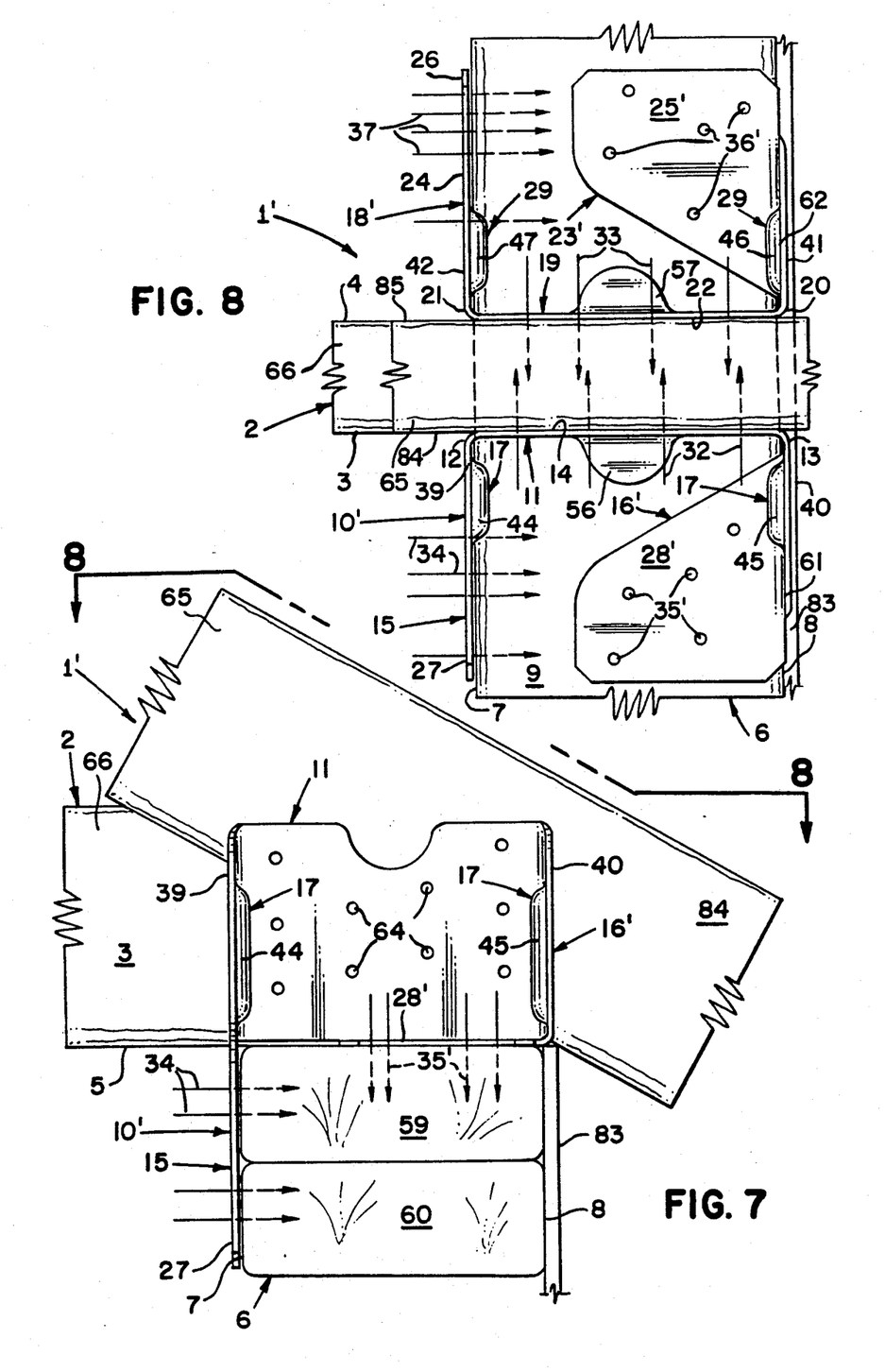
FIG. 7 is an end view of a modified form of the connection showing a presheathed outside wall.
FIG. 8 is a top plan view of the modified form of the connection illustrated in FIG. 7 taken generally along line 8—8 in FIG. 7.

Referring to FIGS. 7 and 8, a modified bearing connection 1' in a building structure includes a load carrying wood structural member 2 having first and second opposed sides 3 and 4 and a lower edge 5, and a generally horizontally disposed wood plate member 6 having first and second sides 7 and 8 and mounted below the load carrying wood structural member 2 and having an upper surface 9 for supporting a portion of the lower edge 5 of the load carrying wood structural member 2; wherein the improvement includes: a first single piece sheet metal connector 10' having a generally upright member 11, a pair of side edges 12 and 13 and a face 14, disposed in juxtaposition with the first side 3 of the load carrying wood structural member 2, first and second leg members 15 and 16' respectively and integrally connected to the side edges 12 and 13 of the generally upright member 11 and extending angularly therefrom a selected distance wherein a lower portion 27 of the first leg member 15 registers with the first side 7 of the wood plate member 6 and a lower portion 28' of the second leg member 16' is folded inwardly at a right angle along bend line 61 and registers with the upper surface 9 of the wood plate member 6, and stiffening means 17 formed in upper portions 39 and 40 of each of the first and second leg members 15 and 16' for increasing the column strength of the first and second leg members 15 and 16'; a second single piece sheet metal connector 18' including: a generally upright member 19 having a pair of side edges 20 and 21 and a face 22, disposed in juxtaposition with the second side 4 of the load carrying wood structural member 2, first and second leg members 23' and 24 respectively and integrally connected to the side edges 20 and 21 of the generally upright member 19 and extending angularly therefrom a selected distance within a lower portion 25' of the first leg member 23' is folded inwardly at a right angle along bend line 62 and registers with the upper surface 9 of the wood plate member 6 and a lower portion 26 of the second leg member 24 registers with the first side 7 of the wood plate member 6, and stiffening means 29 formed in upper portions 41 and 42 of each of the first and second leg members 23' and 26 for increasing the column strength of the first and second leg members 23' and 26; a first plurality of fasteners 32 inserted through the face 14 of the generally upright member 11 of the first single piece sheet metal connector 10' in a generally horizontal orientation into the load carrying wood structural member 2; a second plurality of fasteners 33 inserted through the face 22 of the generally upright member 19 of the second single piece sheet metal connector 18' in a generally horizontal orientation into the load carrying wood structural member 2; a third plurality of fasteners 34 inserted through the lower portion 27 of the first leg member 15 of the first single piece sheet metal connector 10' and the first side 7 of the wood plate member 6 and into the wood plate member in a generally horizontal orientation; a fourth plurality of fasteners 35' inserted through the lower portion 28' of the second leg member 16' of the first single piece sheet metal connector 10', through the upper surface 9 of the wood plate member 6 and into the wood plate member 6; a fifth plurality of fasteners 36' inserted through the lower portion 25' of the first leg member 23' of the second single piece sheet metal connector 18', through the upper surface 9 of the wood plate member 6 and into the wood plate member 6; and a sixth plurality of fasteners 37 inserted through the lower portion 26 of the second leg member 24 of the second single piece sheet metal connector 18' and the first side 7 of the wood plate member 6 and into the wood plate member 6 in a generally horizontal orientation.

The single piece sheet metal connectors, 10, 10', 18, and 18' may be attached to the load carrying wood structural member 2 and wood plate member 6 by either nails or screws. The fasteners may be impact driven through the metal connectors by impact devices or hand held hammers. Preferably, however, fastener openings 64 are formed in the upright members 11 and 19, and the lower portions of leg members 15, 16, 23, 24, 25', and 28'. The nail openings in the leg members are spaced to meet nail spacing requirement of various building codes and are spaced so that where plate member 6 is composed of upper and lower plate members 59 and 60, fasteners will be driven into both members. The fastener openings in the upright members are also spaced so that fasteners will be driven into both the upper and lower wood members 65 and 66 where the load carrying wood structural member 2 is a truss. Upper wood member 65 has sides identified by the numbers 84 and 85 in FIGS. 1 thru 8 of the drawings.

Stiffening means 17 and 29 for increasing the column strength of the leg members 15, 16, 16', 23, 23', and 24 in the upper portions 39, 40, 41, and 42 may be effected in several ways. One of the most efficient ways is to stamp an embossment into the metal. The shape of the embossment may vary, but it has been found that a triangular embossment as shown in the drawings and indicated by the numbers 44, 45, 46, and 47 maximizes the rigidity of the unsupported portion of the leg members.

Figure 6:
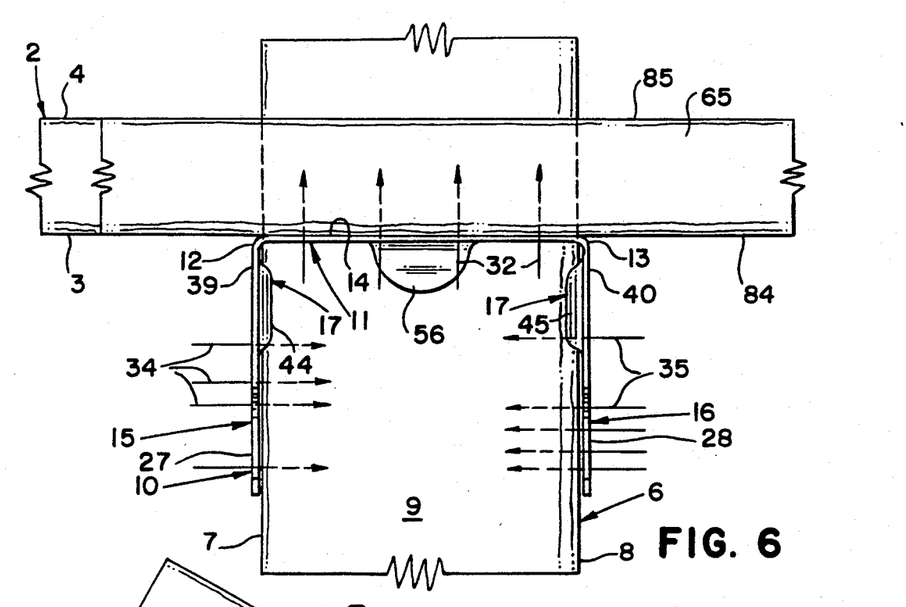
FIG. 6 is a top plane view of a portion of the connection illustrated in FIG. 1 showing the attachment of a single connector.

In most instances, single piece metal connectors 10, 10', 18, and 18' are used in pairs so as to provide resistance to movement of the load carrying wood structural member 2 in both directions longitudinal to the wood plate member. In some instances, however a single sheet metal connector 10 is used as illustrated in FIG. 6. Connector 10 in FIG. 6 is identical to connector 10 in FIG. 1. Like parts have like numbers and no further description is required. The connector 10 in FIG. 6 may be used where another connector such as connector 18 or 18' may not be used because of structural limitations, or the rafter or truss member 2 is connected to some other structural member so that an additional connector 18 or 18' is not required.

To assist in field bending the leg members when the connectors are used with sheathing material as illustrated in FIGS. 7 and 8, elongated openings 67 and 68 may be formed in the bend lines 61 and 62.

The single piece sheet metal connectors 10, 10', 18, and 18' are preferably formed from sheet metal blanks cut from an elongated strip of metal and formed into the shape illustrated in the drawings by progressive die machines. Sheet metal blank 10 illustrated in FIG. 9 is identical to the sheet metal blank used in forming first single piece sheet metal connector 10, first single piece sheet metal connector 10', second single piece sheet metal connector 18 and second single piece sheet metal connector 18'.

Figures 9, 10:
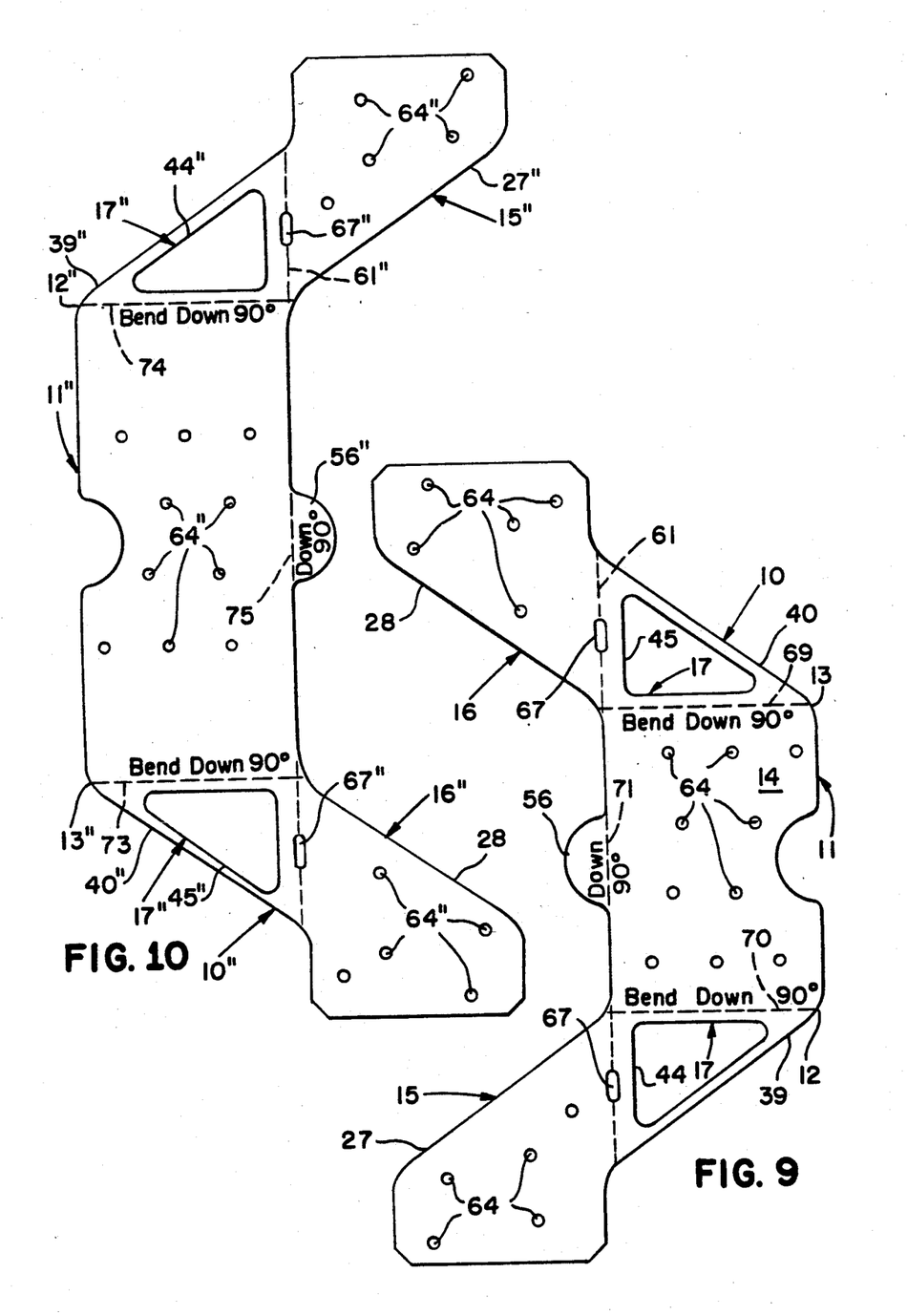
FIG. 9 is a top plan view of a connector blank illustrated in FIG. 1 used with 2"×4" plates.
FIG. 10 is a top plan view of an alternate connector blank used in attaching rafters and trusses to 2"×6" to plates.

Specifically, the sheet metal blank 10 illustrated in FIG. 9 is for use with plate members 6 which have a 4" nominal width and either a 4" nominal thickness or 2 plate members 59 and 60, each having a 2" nominal thickness.

The blank 10" illustrated in FIG. 10 has the same general shape as the blank illustrated in FIG. 9. The upright member 11" has a greater dimension, however, so that the metal connector may be used with wood plate members having a nominal width of 6". Except for the dimensions of upright member 11", the blank illustrated in FIG. 10 is identical in structure as the blank illustrated in FIG. 9. Like numbers have like structure and function and a further description is not repeated. For purposes of clarity, like numbers used in describing the connector blank in FIG. 10 differ from the numbers used in FIG. 9 by the use of the double prime mark (").

The blank illustrated in FIG. 9 may be formed by bending downwardly along bend lines 69 and 70 at a 90° degree angle. Seat member 56 is then formed by ending downwardly along bend line 71 at an angle of 90 degrees.

To make the modified form sheet metal connector 10' illustrated in FIG. 8, the above bending directions are followed, and in addition, second leg member 16' is bent 90 degrees upwardly along bend line 61.

To make the modified form sheet metal connector 18' illustrated in FIG. 8, bends are made along bend lines 69 and 70 to a 90 degree angle, and along bend line 71, and in addition, a 90 degree upward bend is made along bend line 62 in first leg member 23'.

To form the modified form of the invention illustrated in FIG. 10, the same type of bends are made along bend lines 73, 74, 75 and 61" as are made in forming the connector from the blank illustrated in FIG. 9 and are not repeated.

Figure 1:
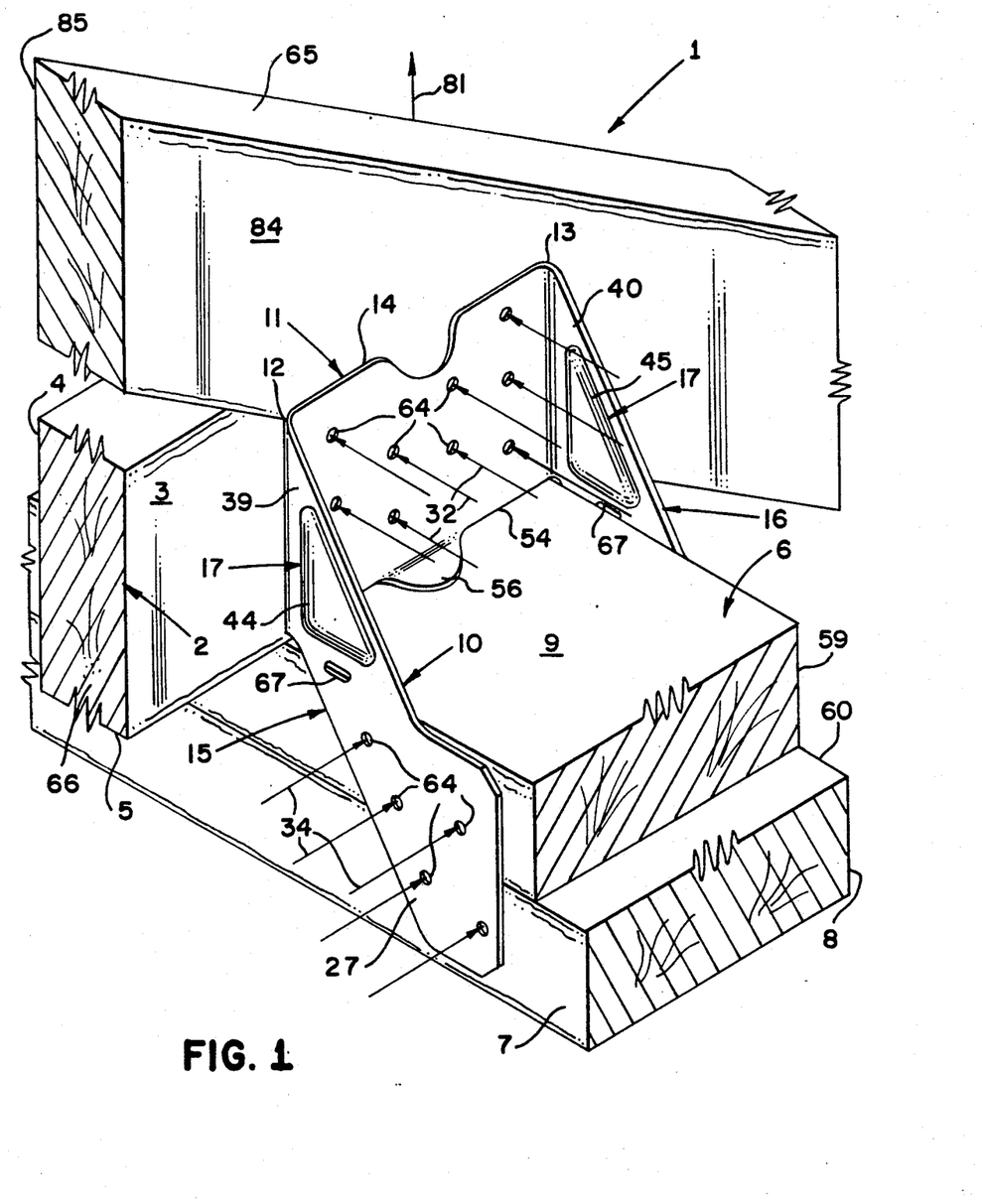
FIG. 1 is a perspective view of a portion of the bearing connection of the present invention attached to a wood truss bearing upon a double plate.
Figure 2:
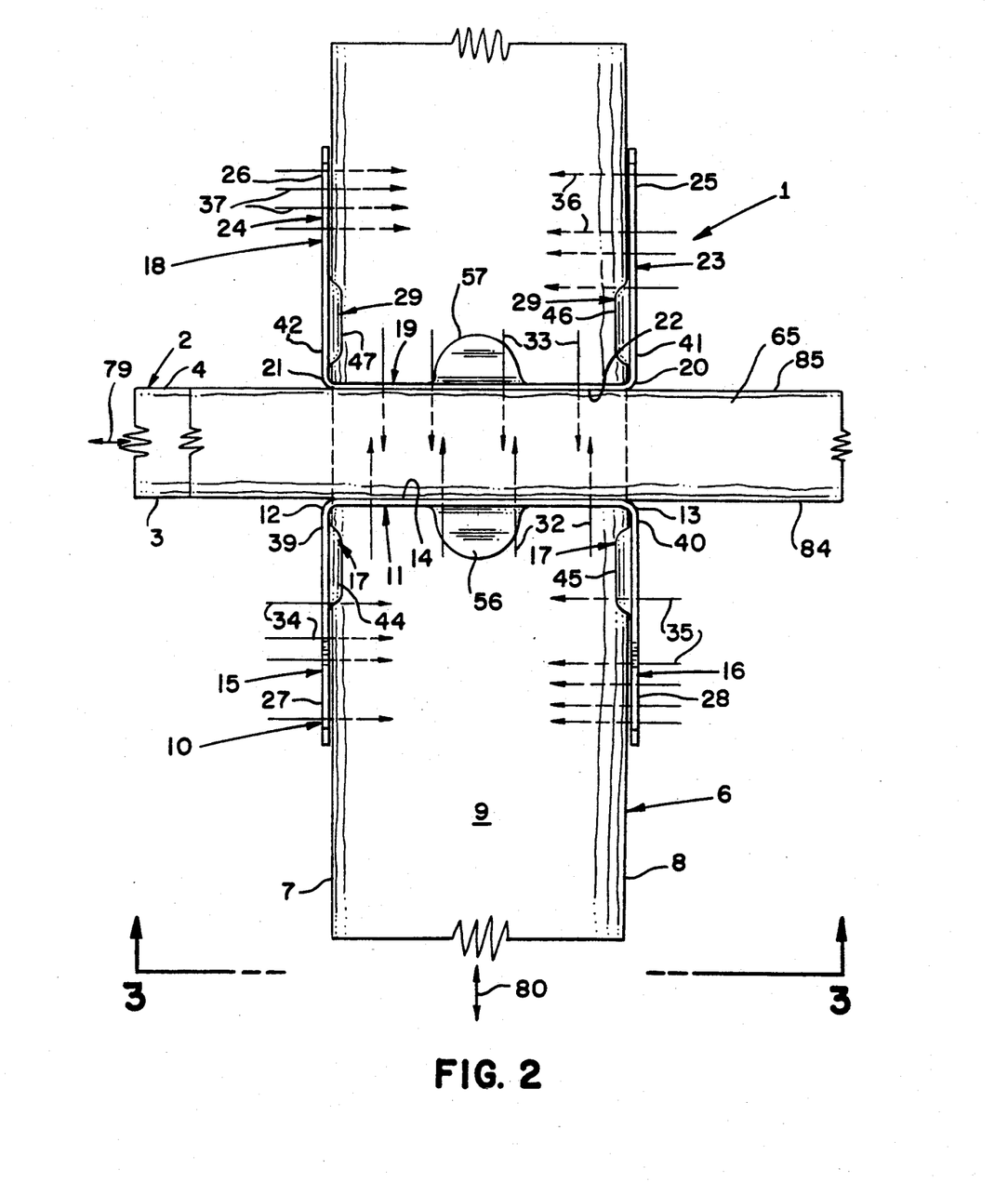
FIG. 2 is a top plan view of the connection illustrated in FIG. 1.
Figure 3:
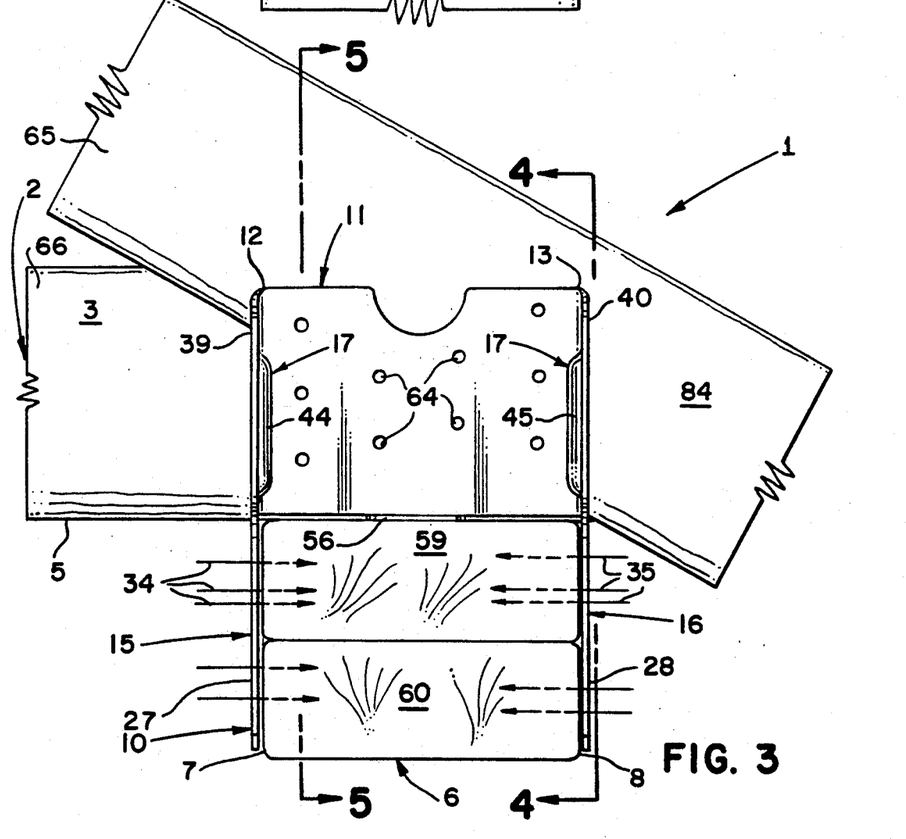
FIG. 3 is an end view of the connection illustrated in FIG. 2 taken generally along line 3—3 in FIG. 2
Figure 4:
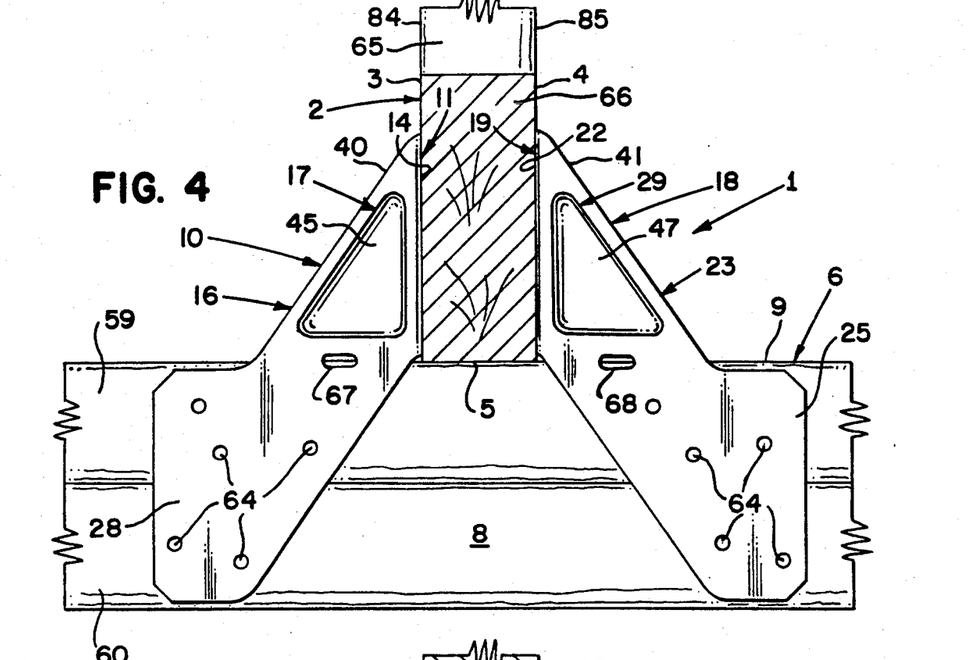
FIG. 4 is a side view of the connection illustrated in FIG. 1 taken along line 4—4 in FIG. 3.
Figure 5:
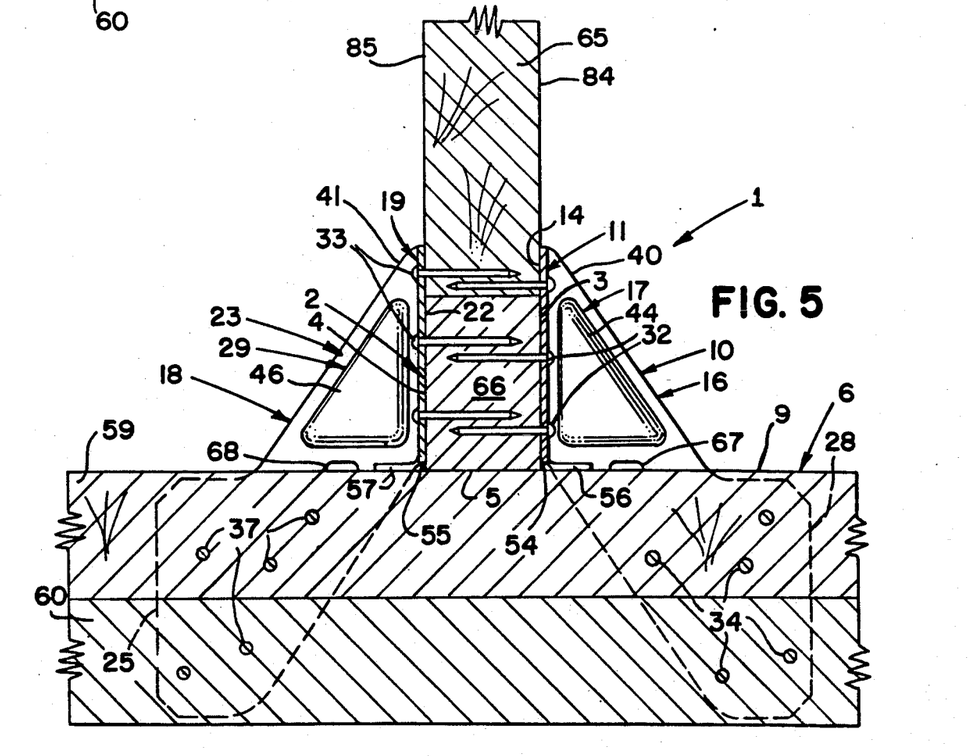
FIG. 5 is a partial cross sectional view of the connection illustrated in FIG. 1 and taken along line 5—5 in FIG. 3.

Installation of the connection illustrated in FIG. 1 and 2 is as follows. First single piece sheet metal connector 10 is placed on wood plate member 6 with first leg member 15 in registration with first side 7 and second leg member 16 placed in registration with second side 8. Upright member 11 is placed in a generally vertical position with seat member 56 registering with upper surface 9 of plate member 6 and bend line 61 generally in registration with upper surface 9. First plurality of fasteners such as nails indicated by the arrows 32 are then hammered or otherwise driven through openings 64 in generally upright member 11 into structural member 2. If structural member 2 is a single rafter such as lower member 66, then all nails are driven into this single member. If the structural member is a truss as illustrated in FIG. 1, then some of the nails are driven into upper member 65 and the other nails are driven into lower member 66. Next, the process is repeated with second plurality of fasteners 33 driven through openings 64 in face 22 of second single piece sheet metal connector 18' into second side 4 of lower member 66 and second side 85 of upper member 65.

First and second plurality of fasteners 32 and 33 may be either driven into structural member 2 before or after the structural member is placed on wood plate member 6. Where the structural member is a truss which will move horizontally outwardly in relation to the truss after the truss is placed on the plate member, it is preferred that the first and second metal connectors be fastened to the structural member 2 after it has been placed on the plate member 2 and given time to adjust. Using this construction procedure, there is no need to accurately pre-attach the connectors to the structural member 2.

Next, third fourth, fifth and sixth plurality of nails 34, 35, 36, and 37 are driven into the sides 7 and 8 of the plate member 6 as illustrated in FIGS. 1 and 2.

When properly installed, the single piece sheet metal connectors 10 and 18 prevent horizontal movement of the structural member 2 in two directions transverse to plate member 6 as shown by double headed arrow 79 illustrated in FIG. 2, and in two directions parallel to the plate member 6 as shown by double headed arrow 8 as illustrated in FIG. 2.

Although the connection of the present invention is primarily designed to transfer load through the attaching fasteners and the connectors 10, 10', 18, and 18' to provide additional bearing where the plate members are constructed from wood which would be crushed under the loads imposed by the structural member 2, there are also important additional structural advantages.

The primary additional benefit is the resistance to upward forces as indicated by arrow 81 which may be imposed by earthquakes, hurricanes or other high velocity wind forces. The connectors of the present invention reduce or eliminate the need for separate seismic sheet metal ties which have little bearing enhancement function.

Another benefit effected by the connectors of the present invention is to provide a strengthening of the load carrying member 2 by tying upper and lower member 65 and 66 to each other, and attaching both members to plate member 6.

Finally, the single piece sheet metal connectors 10 and 18 assist in typing the entire roof structure of a building to the wall structure.

The modified form of the invention illustrated in FIGS. 7 and 8 is used primarily where a sheathing board or plywood board 83 is attached to either first side 7 or second side 8 of the wood plate member 6. By bending the lower portion 28' of second leg member 16' and lower portion 25' of first leg member 23', no portion of the connectors interfere with the installation of the sheathing boards 83. At the same time, the distribution of bearing load, the restraint of upward loads, and restraint of the the load carrying structural member 2 in all horizontal directions is retained.

We claim:

1. A bearing connection in a building structure including a load carrying wood structural member having first and second opposed sides and a lower edge, and a generally horizontally disposed wood plate member having first and second sides and mounted below said load carrying wood structural member and having an upper surface for supporting a portion of said lower edge of said load carrying wood structural member; the improvement comprising:
   a. a first metal connector including:
      1. a generally upright member having a pair of side edges and a face, disposed in juxtaposition with said first side of said load carrying wood structural member,
      2. first and second leg members respectively and integrally connected to said side edges of said generally upright member and extending angularly therefrom a selected distance wherein a lower portion of said first leg member registers with said first side of said wood plate member and a lower portion of said second leg member registers with said second side of said wood plate member, and
      3. stiffening means formed in an upper portion of each of said first and second leg members for increasing the column strength of said first and second leg members;
   b. a second metal connector including:
      1. a generally upright member having a pair of side edges and a face, disposed in juxtaposition with said second side of said load carrying wood structural member,
      2. first and second leg members respectively and integrally connected to said side edges of said generally upright member and extending angularly therefrom a selected distance wherein a lower portion of said first leg member registers with said second side of said wood plate member and a lower portion of said second leg member registers with said first side of said wood plate member, and
      3. stiffening means formed in an upper portion of each of said first and second leg members for increasing the column strength of said first and second leg members;
   c. a first plurality of fasteners inserted through said face of said generally upright member of said first metal connector in a generally horizontal orientation into said load carrying wood structural member;
   d. a second plurality of fasteners inserted through said face of said generally upright member of said second metal connector in a generally horizontal orientation into said load carrying wood structural member;
   e. a third plurality of fasteners inserted through said lower portion of said first leg member of said first metal connector and said first side of said wood plate member and into said wood plate member in a generally horizontal orientation;
   f. a fourth plurality of fasteners inserted through said lower portion of said second leg member of said first metal connector and said second side of said wood plate member and into said wood plate member in a generally horizontal orientation;
   g. a fifth plurality of fasteners inserted through said lower portion of said first leg member of said second metal connector and said second side of said wood plate member and into said wood plate member in a generally horizontal orientation; and
   h. a sixth plurality of fasteners inserted through said lower portion of said second leg member of said second metal connector and said first side of said wood plate member and into said wood plate member in a generally horizontal orientation.

2. A bearing connection as described in claim 1 wherein:
   a. said stiffening means formed in each of said leg members consists of an embossment; and
   b. said first and second metal connectors are made from a single piece sheet metal blank.

3. A bearing connection as described in claim 1 wherein:
   a. said stiffening means formed in each of said leg members consists of a triangular embossment.

4. A bearing connection as described in claim 1 comprising:
   a. said generally upright members are formed with bottom edges; and
   b. seat members connected to said bottom edges of said upright members and protruding therefrom at generally right angles for resting on said upper surface of said wood plate member.

5. A bearing connection as described in claim 1 wherein:
   a. said generally horizontally disposed wood plate member consists of upper and lower wood plate members laid one on top of the other.

6. A bearing connection in a building structure including a load carrying wood structural member having first and second opposed sides and a lower edge, and a generally horizontally disposed wood plate member having first and second sides and mounted below said load carrying wood structural member and having an upper surface for supporting a portion of said lower edge of said load carrying wood structural member; the improvement comprising:
   a. a first single piece sheet metal connector including:
      1. a generally upright member having a pair of side edges and a face, disposed in juxtaposition with said first side of said load carrying wood structural member, 2. first and second leg members respectively and integrally connected to said side edges of said generally upright member and extending angularly therefrom a selected distance wherein a lower portion of said first leg member registers with said first side of said wood plate member and a lower portion of said second leg member is folded inwardly at a right angle and registers with said upper surface of said wood plate member, and
3. stiffening means formed in an upper portion of each of said first and second leg members for increasing the column strength of said first and second leg members;

b. a second single piece sheet metal connector including:
1. a generally upright member having a pair of side edges and a face, disposed in juxtaposition with said second side of said load carrying wood structural member,
2. first and second leg members respectively and integrally connected to said side edges of said generally upright member and extending angularly therefrom a selected distance wherein a lower portion of said first leg member is folded inwardly art a right angle and registers with said upper surface of said wood plate member and a lower portion of said second leg member registers with said first side of said wood plate member, and
3. stiffening means formed in an upper portion of each of said first and second leg members for increasing the column strength of said first and second leg members;

c. a first plurality of fasteners inserted through said face of said generally upright member of said first single piece sheet metal connector in a generally horizontal orientation into said load carrying wood structural member;

d. a second plurality of fasteners inserted through said face of said generally upright member of said second single piece sheet metal connector in a generally horizontal orientation into said load carrying wood structural member;

e. a third plurality of fasteners inserted through said lower portion of said first leg member of said first single piece sheet metal connector and said first side of said wood plate member and into said wood plate member in a generally horizontal orientation;

f. a fourth plurality of fasteners inserted through said lower portion of said second leg member of said first single piece sheet metal connector, through said upper surface of said wood plate member and into said wood plate member;

g. a fifth plurality of fasteners inserted through said lower portion of said first leg member of said second single piece sheet metal connector, through said upper surface of said wood plate member and into said wood plate member; and a sixth plurality of fasteners inserted through said lower portion of said second leg member of said second single piece sheet metal connector and said first side of said wood plate member and into said wood plate member in a generally horizontal orientation.

7. A bearing connection in a building structure including a load carrying wood structural member having first and second opposed sides and a lower edge, and a generally horizontally disposed wood plate member having first and second sides and mounted below said load carrying wood structural member and having an upper surface for supporting a portion of said lower edge of said load carrying wood structural member; the improvement comprising:

a. a first single piece sheet metal connector including:
1. a generally upright member having a pair of side edges and a face, disposed in juxtaposition with said first side of said load carrying wood structural member,
2. first and second leg members respectively and integrally connected to said side edges of said generally upright member and extending angularly therefrom a selected distance wherein a lower portion of said first leg member is folded inwardly at a right angle and registers with said upper surface of said wood plate member and a lower portion of said second leg member is folded upwardly at a right angle and registers with said upper surface of said wood plate member, and
3. stiffening means formed in an upper portion of each of said first and second leg members for increasing the column strength of said first and second leg members;

b. a second single piece sheet metal connector including:
1. a generally upright member having a pair of side edges and a face, disposed in juxtaposition with said second side of said load carrying wood structural member,
2. first and second leg members respectively and integrally connected to said side edges of said generally upright member and extending angularly therefrom a selected distance wherein a lower portion of said first leg member is folded inwardly at a right angle and registers with said upper surface of said wood plate member and a lower portion of said second leg member is folded upwardly at a right angle and registers with said upper surface of said wood plate member, and
3. stiffening means formed in an upper portion of each of said first and second leg members for increasing the column strength of said first and second leg members;

c. a first plurality of fasteners inserted through said face of said generally upright member of said first single piece sheet metal connector in a generally horizontal orientation into said load carrying wood structural member;

d. a second plurality of fasteners inserted through said face of said generally upright member of said second single piece sheet metal connector in a generally horizontal orientation into said load carrying wood structural member;

e. a third plurality of fasteners inserted through said lower portion of said first leg member of said first single piece sheet metal connector through said upper surface of said wood plate member and into said wood plate member in a generally vertical orientation;

f. a fourth plurality of fasteners inserted through said lower portion of said second leg member of said first single piece sheet metal connector, through said upper surface of said wood plate member and into said wood plate member;

g. a fifth plurality of fasteners inserted through said lower portion of said first leg member of said second single piece sheet metal connector, through said upper surface of said wood plate member and into said wood plate member; and h. a sixth plurality of fasteners inserted through said lower portion of said second leg member of said second single piece sheet metal connector and said first side of said wood plate member and into said wood plate member in a generally vertical orientation.

* * * * *

UNITED STATES PATENT AND TRADEMARK OFFICE
CERTIFICATE OF CORRECTION

PATENT NO.   :  5,109,646
DATED        :  May 5, 1992
INVENTOR(S)  :  Karen W. Colonias and Michael W. Bugbee It is certified that error appears in the above-identified patent and that said Letters Patent is hereby corrected as shown below:

Column 1, line 11, change the word "spruce-pin-fir" to ---spruce-pine-fir---
Column 1, line 18, after the words "truss in" change the word "the" to ---a---
Column 1, line 43, after the word "provides" change "increases" to ---increased---
Column 1, line 46, after the word "connecting" change "nail" to ---nails---
Column 3, line 3, after the words "a first" insert ---plurality---
Column 3, line 40, after the words "and 47." delete "p" and start a new paragraph
Column 4, line 18, after the word "distance" change "within" to ---wherein---
Column 5, line 20, after the words "plate member" insert ---6---
Column 7, lines 5&6, after the words "and lower" change "member" to ---members---
Column 10, line 41, after the word "folded" change "upwardly" to ---inwardly---
Column 12, line 2, after the words "metal connector" delete "and said first side" insert ---through said upper surface---

Signed and Sealed this

Sixth Day of July, 1993

Attest:

MICHAEL K. KIRK

*Attesting Officer*        Acting Commissioner of Patents and Trademarks